3,022,326
URETHANE MODIFIED VEGETABLE OIL

Herbert M. Schroeder, Williamsville, and Donald J. Waythomas, Lancaster, N.Y., assignors, by mesne assignments, to Textron Inc., a corporation of Rhode Island
No Drawing. Filed Oct. 29, 1958, Ser. No. 770,258
9 Claims. (Cl. 260—404.5)

The present invention relates to urethane modified vegetable oils capable of forming films which are very flexible and which are substantially non-embrittled with age.

In an application for patent filed October 29, 1958 under Serial No. 770,372, now U.S. Patent 2,970,062, there is described a fast drying urethane modified vegetable oil of specified oil length and possessing a stable viscosity and, in Serial No. 770,259, filed October 29, 1958, there is described a urethane modified oil drying rapidly to very hard films.

For certain uses, it is desired to have available a film-forming vehicle capable of producing films in which flexibility of the resultant film is a wanted characteristic.

It is an object of the present invention therefore to produce urethane modified vegetable oils capable of producing films of exceptional flexibility and suitable for use where an extreme degree of flexure is demanded, as for instance in the impregnation and coating of belts of the so-called endless belt type.

In accordance with the broad aspects of the present invention, a diol oil ester of a higher fatty acid is prepared. In the practical aspect, a vegetable oil is first changed to a diol oil ester by subjecting the vegetable oil to alcoholysis with a polyol which is at least trifunctional. The amount of the polyol will be from about 15% to about 20.5% based on the weight of the oil.

The oils suitable for the present invention are those vegetable oils which are unsaturated in the fatty chain, the fatty acid residues therefore being either monoethenoid, diethenoid or triethenoid in character. Vegetable oils containing such groups are the drying oils such as linseed oil, safflower oil, perilla oil, as well as the so-called semi-drying oils such as soybean oil and mixtures thereof with other vegetable oils not considered to be drying oils.

It is also possible to prepare the diol oil esters from the unsaturated fatty acids themselves by esterifying the acid with the desired polyfunctional alcohol, the object in view being to prepare a so-called diol oil ester.

In order to prepare a urethane modified oil capable of producing a flexible film, the oil length in the final product should be within the range 20% to 75%.

As a reactant there is prepared for reaction with a polyisocyanate a diol oil ester-polyglycol system by addition of a polyglycol to the diol oil ester and the resultant system reacted upon a stoichiometrically equivalent basis with the selected diisocyanate. The polyglycols employed to produce the system above mentioned may be either the liquid or solid polyglycols and may fall within the molecular weight range of from about 150 to 2,000 or more, the best examples of such polyglycols are the well known polyethylene glycol and polypropylene glycol generally designated with molecular weight indicia, such as "polyethylene glycol 200" or "polypropylene glycol 1025," etc. Urethane modified products produced from diol oil ester-polyglycol systems containing the relatively higher molecular weight polyglycols form films of somewhat better flexibility than when employing the lower molecular weight polyglycols although in the latter circumstance, a resultant film is relatively harder.

From a practical operating point of view, a vegetable oil, i.e., a triglyceride of a higher fatty acid, will be the starting material and the ingredients are so chosen in amount to produce an oil length in the final product of from about 25% to 75%, the remainder being generally considered as ingredients added to produce the polyurethane modification.

From the vegetable oil, therefore, there is produced a diol oil ester by alcoholysis of the triglyceride. The polyol chosen for the alcoholysis reaction is thus, for instance, glycerine, trimethylolpropane, trimethylolethane, pentaerythritol or its lower polymers such as tripentaerythritol, and other polyols all of which are at least trifunctional in nature.

After the alcoholysis there is produced the diol oil ester-diol system heretofore mentioned by incorporating in the reaction mix a polyglycol of the type above defined. This system possesses a determinable hydroxyl value from which can be determined the equivalent amount of diisocyanate required to react therewith to produce the final stable system of the present invention, i.e., a system possessing substantially no free and unreacted isocyanate group.

The reaction may be carried out on a 100% solids basis or may be performed in a solvent system or environment. The solvent may be any inert organic solvent but generally it will be preferred to select as solvent those employed in and well known to the paint and varnish trade, as for instance either what is called "aromatic solvent" or "hydrocarbon solvent."

In general the diol oil ester-polyglycol system will be added slowly to the diisocyanate contained in a part or all of the solvent desired in the final product. The temperature of addition is controlled to be below about 130° F. and after addition is complete the reaction is maintained for an additional time to permit the reaction of the polyols of the diol system with the diisocyanate to proceed until the isocyanate is less than about 20% of the initial isocyanate added. At this point, when employing a solvent environment for the reaction, part or all of the solvent may be added to the reaction mixture and the temperature raised to above 130° F. but below the boiling point of the solvent and the system heated in that range until the unreacted isocyanate group is substantially zero. This final reaction time is generally on the order of one-half hour, at which time the free isocyanate (—NCO) is less than about 1%.

The final product is soluble in the usual paint and varnish makers' solvents and when such solution is applied a tough, flexible film results.

The following examples are illustrative of the principles of the invention and are not deemed to be limitative thereof.

EXAMPLE 1

A typical diol oil ester for use in the present invention may be prepared from linseed oil, for instance, and pentaerythritol, for instance, by heating 1400 parts by weight of alkali refined linseed oil (Superior linseed oil) with 214 parts by weight of pentaerythritol at alcoholizing temperatures and, if desired, in the presence of an alcoholysis catalyst. In general the alcoholysis proceeds smoothly and readily at about 480° F. and as catalyst one may employ about 0.23 part by weight of caustic soda or other alcoholysis catalyst, for instance lead oxide. After about two hours heating at 480° F. a diol oil ester is produced. In this instance with the particular ingredients employed, the hydroxyl value of the alcoholized oil was found to be 181.4.

The reaction here was performed in one of the standard aromatic solvents used in the paint and varnish trade, namely toluene, and to this end 149.5 grams of tolylene diisocyanate was dissolved in 699.5 parts by weight of toluene. 500 parts by weight of the diol oil ester as prepared above, and 50 parts by weight of polypropylene glycol 1025 were added slowly to the solution of the diisocyanate over a two hour period and the temperature maintained at approximately 100° F. during such addition. Thereafter the reaction mixture was heated for an additional three hours at the same temperature, at which time the isocyanate value of the reaction mixture was found to be 0.21%. To insure substantial neutrality of the system with respect to the presence of free isocyanate, the reaction mixture was then heated for about ½ hour at about 248 to 249° F., at which time the isocyanate value was substantially zero or, as determined —0.01%. The end product possessed a nonvolatile content of 50.99%. The viscosity was J+¼.

When a small amount of conventional drier, as for instance 0.03% cobalt, as naphthanate, was added and the material brushed to produce a film, the drying time was found to be as follows:

Set _____ Immediately.
Surface dry _____ 1½ hours.
Through dry _____ 15 hours.

A dry film of 1½ mils (0.0015 inch), which had been cast on a Morest chart, could be doubled back upon itself with the film on the outside of such return bend without producing rupture or cracking of the film.

In this experiment the final urethane modified oil possessed an oil length of approximately 61.5%.

In accordance with this invention the oil length of the final product may be within the range 20% to about 75%. The example above is given merely as illustrative of the procedure employed and is not limitative as it will be understood that considerable variation is permitted in the choice of oil, the amount of oil and the choice of polyglycol and the amount thereof, keeping in mind that, in general, polyglycols of the lower molecular weights produce films which are, in general, somewhat harder and possess less flexure than those produced when employing the higher molecular weight polyglycols.

EXAMPLE 2

To illustrate the production of urethane modified oil producing a flexible film and at a considerably less oil length than Example 1, there was added to 488 parts by weight of tolylene diisocyanate dissolved in 1488 parts by weight xylene, by heating to 100° F., 500 parts by weight of a mixed pentaerythritol-glyceryl ester of linseed oil fatty acids prepared as above indicated in Example 1, and possessing a hydroxyl number of 180.9, and 500 parts by weight of polypropylene glycol 250. This addition was made slowly over a period of one hour, the temperature being maintained substantially constant at 100° F.

After complete addition of the diol oil ester and polyglycol the reaction mixture was heated for three hours at 100° F. at which time the isocyanate value (—NCO) of the mixture was found to be 1.41%.

The reaction mixture was then heated for ½ hour at 250° F. at which time the isocyanate value was zero.

The finished product possessed a nonvolatile content of 51.7% and a viscosity of Z5, and a Gardner color of 6. The drying time of the product containing 0.03% cobalt drier, as naphthanate, was as follows:

Set _____ One hour.
Through dry _____ 17½ hours.

The degree of flexibility of the film so produced was not quite as good as that produced from the composition of Example 1 since the oil length was at the lower end of the permitted range, namely, 22.1%.

EXAMPLE 3

In this example the diol oil ester was a mixture of the diol pentaerythritol ester of linseed oil of Example 1 and a pentaerythritol diol ester of coconut oil, these esters being used in the proportion of 3 parts of the linseed ester to 1 part of the coconut oil ester. This mixture of esters in the amount of 500 parts by weight plus 150 parts by weight of polypropylene glycol 250 was added slowly, as in the other examples, to 245.4 parts by weight of tolylene diisocyanate dissolved in 895.4 parts by weight xylene, at 100° F. After the addition and further maintenance of reaction at 100° F. for about 3 hours, the isocyanate value had dropped to 2.18%. The reaction mixture was then heated to 250° F. for ½ hour, at which time the isocyanate value was determined as 0.05%, that is, substantial neutrality, or less than 1%, with respect to this value. The nonvolatile content of the end product was 49.9%, which product possessed a viscosity of W+½ with a color of 6 on the Gardner color scale.

Xylene solution, when spread in the usual way to produce a film, produced a flexible film with the usual drier addition, which film on a Morest chart could be doubled back upon itself in the fashion of the films of Examples 1 and 2.

In substantially the same fashion, other films could be produced from compositions shown in the table below, which compositions were prepared by the procedure outlined and specifically illustrated above.

*Table 1*

| Ex. | Veg. Oil Used | | Amount of Penta-erythritol, percent | Polyglycol Used | | TDI, Amount, percent |
|---|---|---|---|---|---|---|
| | Type | Amt., percent | | Type | Amt., percent | |
| 4 | Lin | 60.0 | 8.04 | PEG 200 | 6.8 | 25.1 |
| 5 | Lin | 51.25 | 6.9 | PEG 150 | 11.65 | 30.0 |
| 6 | Lin | 60.0 | 8.25 | PPG 250 | 6.875 | 24.4 |
| 7 | Lin | 54.5 | 7.3 | PPG 250 | 12.3 | 26.0 |
| 8 | {Lin | 12.25 | 1.68 | PPG 250 | 16.7 | 27.4 |
| | {Coco | 36.80 | 4.96 | | | |
| 9 | Lin | 29.6 | 3.97 | PPG 250 | 33.6 | 32.8 |
| 10 | Lin | 56.6 | 7.4 | PPG 425 | 12.8 | 23.2 |
| 11 | Lin | 47.75 | 6.3 | PPG 425 | 21.7 | 24.1 |
| 12 | Lin | 58.25 | 7.8 | PPG 1025 | 13.2 | 20.9 |
| 13 | Lin | 50.25 | 6.75 | PPG 1025 | 22.8 | 20.2 |

Code:
Coco.—Coconut oil.
Lin.—Linseed oil.
PEG—Polyethylene glycol.
PPG—Polypropylene glycol.
TDI—Tolylene diisocyanate.

The characteristics of the films produced from the thirteen examples given above are set forth in Table 2 below. As indicated, films of the above composition, 1½ mils thick, were cast upon a Morest chart from solvents containing approximately 50% nonvolatile material and flexibility determined by bending the chart back upon itself as described above; those that did not crack were indicated as flexible.

The table below shows the viscosity of the final composition at approximately 50% nonvolatile content and its substantial freedom from unreacted isocyanate, i.e., an *NCO value of less than 1%, together with dry time determined with drier, 0.03% cobalt as naphthanate, as standard procedure.

*Table 2*

| Ex. | Viscosity | NCO Value, Percent | NV Content, Percent | Set Time, Hours | Through Dry, Hours |
|---|---|---|---|---|---|
| 1 | J+¼ | 0.01 | 50.99 | 0 | 15 |
| 2 | Z2 | Zero | 51.7 | 1 | 17 |
| 3 | W+½ | 0.05 | 49.9 | | |
| 4 | I | 0.06 | 50.52 | 0 | 6 |
| 5 | Z6+⅜ | 0.023 | 50.0 | 0 | ½ |
| 6 | J+½ | 0.01 | 50.15 | | |
| 7 | U+¼ | 0.07 | 49.9 | 0 | 21 |
| 8 | S | 0.047 | 49.9 | 0 | 1 |
| 9 | Z5 | 0.00 | 51.7 | 1 | 17.5 |
| 10 | R | 0.040 | 50.3 | 0 | 24 |
| 11 | Y+½ | 0.040 | 50.4 | ¾ | 24 |
| 12 | U | 0.05 | 49.8 | 0 | 15 |
| 13 | Z+½ | 0.07 | 49.9 | 0 | 16 |

The amount of polyglycol employed based on the weight of the diol oil ester-diol system will generally fall within the range 8% to 50% by weight thereof. Quantities of polyglycol greatly in excess of the amount stated herein tend to reduce water resistance in the resultant film, that is, the water sensitivity of the resultant film is increased with higher quantities of polyglycol. The final product here is shelf stable since there is substantially no free isocyanate present.

In addition to the oils illustrated specifically in the 13 examples, it will be understood that vegetable oils generally may be employed and that it is preferred to have a portion of the vegetable oil selected from the group which is generally known as the drying oils and semidrying oils, namely, linseed oil, safflower oil, perilla oil, tall oil acids, soybean oil, as well as others of lesser commercial importance.

When employing a mixture of vegetable oils of which some are considered within the class of nondrying oils, in order to form adherent films which are flexible, it is desired that there be present of the total vegetable oil, at least 20% of drying oil or semidrying oil.

It will be noted that in the invention of the present application the oil length is stated to be 20% to 75% as contrasted with somewhat higher oil length recited in U.S. Patent 2,970,062 mentioned above. This is for the reason that in the invention of the instant application added or additional diol in the form of polyglycol is present in the system as is additional diisocyanate for reaction therewith.

What is claimed is:

1. The method of preparing a urethane modified ethylenically unsaturated vegetable oil having drying properties which comprises reacting, by bringing into contact and heating a hydrocarbon diisocyanate and a diol system comprising a diol ester of an ethylenically unsaturated higher fatty acid of a vegetable oil with a lower hydrocarbon polyol which is at least trifunctional and a polyglycol having a molecular weight in the range 150 to 2000, the amount of said polyglycol comprising from 8% to 50% by weight of said diol system, the amount of diisocyanate employed being substantially equivalent to the total hydroxyl of the diol system, and the amount of diol ester being sufficient to produce a final oil length of 20% to 75%, the reaction being continued under heating until the resultant urethane modified oil possesses substantially no free isocyanate.

2. The method of preparing a urethane modified ethylenically unsaturated vegetable oil having drying properties which comprises slowly adding a diol system comprising a diol ester of an ethylenically unsaturated higher fatty acid of a vegetable oil with a lower hydrocarbon polyol which is at least trifunctional, and a polyglycol having a molecular weight in the range 150 to 2000, the amount of said polyglycol comprising from 8% to 50% by weight of said diol system, to a solution of a hydrocarbon diisocyanate in an inert organic solvent and at a temperature less than about 130° F., continuing the reaction for several hours after such addition and then heating to a temperature above 130° F. but below the boiling point of the solvent until substantially no free isocyanate remains, the amount of diisocyanate employed being substantially equivalent to the total hydroxyl of the diol system and the amount of diol ester employed being sufficient to produce a final oil length of 20% to 75%.

3. Process according to claim 1 wherein the diol system contains as diol ester the alcoholysis product of linseed oil and pentaerythritol.

4. Process of claim 1 wherein the polyglycol is a polyethylene glycol.

5. Process of claim 1 wherein the polyglycol is a polypropylene glycol.

6. A urethane modified ethylenically unsaturated vegetable oil having drying properties prepared by bringing into contact and heating a hydrocarbon diisocyanate and a diol system comprising a diol ester of an ethylenically unsaturated higher fatty acid of a vegetable oil with a lower hydrocarbon polyol which is at least trifunctional and a hydrocarbon polyglycol having a molecular weight in the range 150 to 2000, the amount of said polyglycol comprising from 8% to 50% by weight of said diol system, the amount of diisocyanate employed being substantially equivalent to the total hydroxyl of the diol system, and the amount of diol ester being sufficient to produce a final oil length of 20% to 75%, the reaction being continued under heating until the resultant urethane modified oil possesses substantially no free isocyanate.

7. A product in accordance with claim 6 wherein the diol system contains as diol ester the alcoholysis product of linseed oil and pentaerythritol.

8. A product according to claim 6 wherein the polyglycol is a polyethylene glycol.

9. A product according to claim 6 wherein the polyglycol is a polypropylene glycol.

References Cited in the file of this patent

UNITED STATES PATENTS

| | | |
|---|---|---|
| 2,358,475 | Pratt et al. | Sept. 19, 1944 |
| 2,787,601 | Detrick et al. | Apr. 2, 1957 |
| 2,833,730 | Barthel | May 6, 1958 |
| 2,844,554 | Nichols et al. | July 22, 1958 |

FOREIGN PATENTS

| | | |
|---|---|---|
| 162,598 | Australia | Apr. 27, 1955 |

OTHER REFERENCES

Paint Technology, vol. 15, No. 172 (1950), page 168.
Chemical Engineering, April 1950, pages 165–166.
Industrial and Engineering Chemistry, July 1954, pages 1498–1503.
The Chemical Age, March 31, 1951, pages 481–484.
Angewandte Chemie, vol. 59, No. 9 (1947), pages 257–288, page 269 relied on.